(12) United States Patent
Van De Sluis et al.

(10) Patent No.: US 8,881,102 B2
(45) Date of Patent: Nov. 4, 2014

(54) METHOD OF PRESENTING A PLURALITY OF ITEMS

(75) Inventors: Bartel Marinus Van De Sluis, Eindhoven (NL); Vincentius Paulus Buil, Eindhoven (NL); Elmo Marcus Attila Diederiks, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1523 days.

(21) Appl. No.: 10/567,037

(22) PCT Filed: Jul. 29, 2004

(86) PCT No.: PCT/IB2004/051320
§ 371 (c)(1),
(2), (4) Date: Feb. 2, 2006

(87) PCT Pub. No.: WO2005/015379
PCT Pub. Date: Feb. 17, 2005

(65) Prior Publication Data
US 2006/0218112 A1 Sep. 28, 2006

(30) Foreign Application Priority Data
Aug. 6, 2003 (EP) .................................. 03102441

(51) Int. Cl.
*G06F 9/44* (2006.01)
*G06F 3/048* (2013.01)
*G06F 3/0482* (2013.01)
*G06F 3/033* (2013.01)
*G06F 3/0484* (2013.01)

(52) U.S. Cl.
CPC .............. *G06F 3/0482* (2013.01); *G06F 3/033* (2013.01); *G06F 3/04847* (2013.01)
USPC ........... 717/120; 717/114; 717/121; 717/128; 715/781

(58) Field of Classification Search
CPC ................................ G06F 1/163; G06F 3/033
See application file for complete search history.

(56) References Cited

U.S. PATENT DOCUMENTS 5,561,753 A * 10/1996 Coulombe et al. ............ 715/835
5,561,799 A * 10/1996 Khalidi et al. ................ 707/200

(Continued)

FOREIGN PATENT DOCUMENTS

EP 1220510 A2 7/2002
JP 2001027944 A 1/2001

(Continued)

OTHER PUBLICATIONS

Reinhard Oppermann et al., "A Context-Sensitive Nomadic Exhibition Guide", [Online], Springer 2000, pp. 127-142, [Retrieved from Internet on Jun. 27, 2014], <http://starlings.co.kr/ucc/classroom/784220120425134125.pdf>.*

(Continued)

*Primary Examiner* — Thuy Dao
*Assistant Examiner* — Ziaul A Chowdhury (57) ABSTRACT

The method of the invention enables a user to select an item, associates the item with at least a parameter indicating the geographical area where the item was selected, and presents a collection of items including the item dependent on whether a relation exists between the parameter indicating the geographical area where the item was selected and a parameter indicating the geographical area where the item is being presented. The computer program of the invention enables a programmable device to carry out the method of the invention. The electronic device of the invention is capable of carrying out the method of the invention.

11 Claims, 4 Drawing Sheets

(56) References Cited

U.S. PATENT DOCUMENTS

| | | | |
|---|---|---|---|
| 5,598,524 A * | 1/1997 | Johnston et al. | 715/769 |
| 5,644,738 A * | 7/1997 | Goldman et al. | 715/825 |
| 5,838,322 A * | 11/1998 | Nakajima et al. | 715/846 |
| 6,008,806 A * | 12/1999 | Nakajima et al. | 715/744 |
| 6,177,905 B1 * | 1/2001 | Welch | 342/357.13 |
| 6,466,232 B1 | 10/2002 | Newell et al. | |
| 6,678,724 B2 * | 1/2004 | Nakajima et al. | 709/219 |
| 6,948,126 B2 * | 9/2005 | Malamud et al. | 715/715 |
| 7,055,134 B2 * | 5/2006 | Schroeder | 717/120 |
| 7,058,902 B2 * | 6/2006 | Iwema et al. | 715/810 |
| 7,089,502 B2 * | 8/2006 | Nakajima et al. | 715/777 |
| 7,146,603 B2 * | 12/2006 | Kerpan et al. | 717/120 |
| 7,299,448 B2 * | 11/2007 | Wong et al. | 717/114 |
| 7,721,259 B2 * | 5/2010 | Heinke et al. | 717/121 |
| 8,527,958 B2 * | 9/2013 | Sohm et al. | 717/128 |
| 2001/0019338 A1 * | 9/2001 | Roth | 345/811 |
| 2001/0029184 A1 * | 10/2001 | I'Anson et al. | 455/456 |
| 2002/0083025 A1 | 6/2002 | Robarts et al. | |
| 2002/0122055 A1 * | 9/2002 | Parupudi et al. | 345/737 |
| 2002/0142768 A1 | 10/2002 | Murata et al. | |
| 2002/0160817 A1 | 10/2002 | Salmimas et al. | |
| 2003/0014293 A1 | 1/2003 | Shetty et al. | |
| 2005/0136903 A1 * | 6/2005 | Kashima et al. | 455/418 |
| 2009/0064106 A1 * | 3/2009 | Webster | 717/120 |

FOREIGN PATENT DOCUMENTS

| | | |
|---|---|---|
| JP | 2002024223 A | 1/2002 |
| JP | 2002078004 A | 3/2002 |
| JP | 2002092003 A | 3/2002 |
| JP | 2002259011 A | 9/2002 |
| JP | 2002286493 A | 10/2002 |
| JP | 2003085248 A | 3/2003 |
| JP | 2003179700 A | 6/2003 |
| WO | 0225824 A2 | 3/2002 |

OTHER PUBLICATIONS

Christian Kray et al. "Presenting Route Instructions on Mobile Devices", [Online], Jun. 2003, pp. 117-124, [Retrieved from Internet on Jun. 27, 2014], <http://idwebhost-202-147.ethz.ch/Courses/geog596/Kray_RouteInstructionsOnMobileDevices_03@2008-09-04T18%3B08%3B50.pdf>.*

Karla A. V. Borges et al., "Discovering Geographic Locations in Web Pages Using Urban Addresses", [Online], 2007, pp. 31-36, [Retrived from Internet on Jun. 27, 2014], <http://delivery.acm.org/10.1145/1320000/1316957/p31-borges.pdf>.*

Reichenbacher, Tumasch, "Adaptive Method For Mobile Cartography", [Online], Aug. 2003, pp. 43-53, [Retrieved from Internet on Jun. 27, 2014], <http://www.lfk.bv.tum.de/fileadmin/user_upload/publications/reichenbacher/ICC2003_Paper.pdf>.*

Evangelos P. Markatos, et al: A Top-10 Approach to Prefetching on the Web, Aug. 1996, pp. 1-15.

Gareth J. F. Jones, et al: Challengs and Opportunities for Context-Aware Retrieval on Mobile Devices, pp. 1-10.

Context Aware Computing, A Tangis White Paper on the Future of Mobile/Wireless Computing, Apr. 2001.

Brain D. Davison, Predicting Web Actions from HTML Content, Hypertext, Lehigh Univ, Jun. 2002.

* cited by examiner

METHOD OF PRESENTING A PLURALITY OF ITEMS

The invention relates to a method of presenting a plurality of items.

The invention further relates to a computer program with which a method of presenting a plurality of items can be carried out.

The invention further relates to an electronic device which is capable of presenting a plurality of items.

Microsoft Windows XP, for example, uses such a method in its start menu. The left side of the Microsoft Windows XP start menu contains a program list, which is divided into two sections: a 'pinned list' and a Most Frequently Used (MFU) list. The MFU list keeps track of how often programs are used and displays them in order of most used (top) to least used (bottom). It is a drawback of the method used by Microsoft Windows XP that often programs that are likely to be used are not in the MFU list These programs are presented only when a user selects the 'More Programs' menu at the bottom of the MFU list, which displays other programs that are installed.

It is a first object of the invention to provide a method of the kind described in the opening paragraph, which more accurately accentuates an item that is likely to be selected from a plurality of items.

It is a second object of the invention to provide an electronic device of the kind described in the opening paragraph, which can more accurately accentuate an item that is likely to be selected from a plurality of items.

According to the invention, the first object is realized in that the method of presenting a plurality of items comprises the steps of: enabling a user to select an item in a selection context, a selection context representation representing the selection context, the selection context representation including at least a parameter indicating a geographical area; associating said item with said selection context representation; and presenting a plurality of items including said item in a presentation context in dependence upon a relation between a presentation context representation representing the presentation context and said selection context representation, the presentation context representation including at least a parameter indicating a geographical area. The inventors have recognized that there is a relation between a location and items that are selected in the location. An item may be, for example, a bookmark, a content item, a program, or a function. A function may be used, for example, to change a setting of a device, e.g. brightness, volume or contrast. By presenting a plurality of items in dependence upon a relation between the location at the time of selecting one or more of the plurality of items and the location at the time of presenting the plurality of items, items that are likely to be selected at the moment of presentation are accentuated.

In an embodiment of the method of the invention, the relation between said selection context representation and said presentation context representation is determined to exist if said presentation context and said selection context at least partly overlap. The geographical area parameter in the selection context representation may represent the location at the time of selection or an area around the location at the time of selection. The geographical area parameter in the presentation context representation may represent the location at the time of presentation or an area around the location at the time of presentation. The relation may be determined to exist, for example, if the location at the time of selection is situated within the area around the location at the time of presentation or if the location at the time of presentation is situated within the area around the location at the time of selection. A large geographical area, e.g. a country or a city, may be partitioned in a plurality of smaller geographical areas. In this case, the relation may exist, for example, if the (smaller) area around the location at the time of selection and the (smaller) area around the location at the time of presentation fully overlap. If the large geographical area is not partitioned, the relation may exist, for example, if the area around the location at the time of selection and the area around the location at the time of presentation partly or fully overlap.

A position of said item in said presentation may depend on said relation between said presentation context representation and said selection context representation. By strategically positioning items on a display or a page, these items become more noticeable. The items for which said relation exists may be positioned, for example, in the middle of the display or page with a white space surrounding the items or at the top of the display or page. Alternatively, the presence of said relation for said item may be indicated in another way, such as, for example, by adapting font size and/or font type.

The presentation of the plurality of items may depend on at least one of: a number of times said item has been selected in said selection context and a date of a most recent selection of said item in said selection context If said item has been selected many times and/or recently in said selection context, it is more likely to be selected in the presentation context than another item that has been selected in said selection context, but has not been selected as many times and/or as recently. The presentation may be adapted to show this. If the presentation depends on both a number of times said item has been selected in said selection context and a date of a most recent selection of said item in said selection context, the influence of each of these factors on the presentation may be weighed.

The plurality of items may be presented in an order in accordance with at least one of: a number of times each of the plurality of items has been selected and a date of a most recent selection of each of the plurality of items. By presenting items most likely to be selected at the top of a screen or page, these items are accentuated. When a user is able to select one from the plurality of items in the presentation, the cursor or pointer may be positioned on the top item, allowing the user to select items most likely to be selected with the least effort. Items for which there is a relation between said selection context parameter and said presentation context parameter may be either separated from or mixed with the items for which there is no such relation. In the first case, the top of the presentation may contain the items with the relation ordered by a number of times these items have been selected in said selection context and/or a date of a most recent selection of said item in said selection context, and the bottom of the presentation may contain the items without the relation ordered by a number of times these items have been selected in any selection context and/or a date of a most recent selection of said item in any selection context. In the latter case, all items may be ordered by a number of times these items have been selected in any selection context and/or a date of a most recent selection of said item in any selection context Presence of the relation can then be indicated in another way, for example, by adapting font size and/or font type.

The presentation may be personalized for a certain user and the presentation may depend on whether the certain user is the user that selected said item. It may sometimes be interesting for the certain user to see what items are likely to be selected by a group of users at the moment of presentation, especially if the user has not visited a certain location yet, but different users often have different preferences and are likely to select different items. This fact may make it advantageous to use only the history of selections made by the certain user.

Both the selection context representation and the presentation context representation may include a parameter indicating a geographical area as well as a parameter indicating a recurring time period, and determining the relation between the selection context representation and the presentation context representation may comprise applying a first weight to a relation between the geographical areas and applying a second weight to a relation between the recurring time periods. Sometimes, there is a relation between a recurring time period and items that are selected in the recurring time period. The recurring time period may be, for example, Tuesday, morning, evening, or 10:00-12:00 a.m. This parameter may also be taken into account when accentuating items that are likely to be selected at the moment of presentation. Although the geographical area parameter seems more important than the recurring time period parameter, the exact importance of the parameters is not known. Users or implementers of the method may assign a weight to each parameter based on a measured or predicted importance of the parameters. Each parameter may have, for example, an equal weight. Other parameters may also be taken into account These parameters may indicate, for example, whether a user is walking, jogging, bicycling, or sitting.

According to the invention, the second object is realized in that the electronic device comprises: a selection means for enabling a user to select an item in a selection context, a selection context representation representing the selection context, the selection context representation including at least a parameter indicating a geographical area; an associating means for associating said item with said selection context representation; and a presenting means for presenting a plurality of items including said item in a presentation context in dependence upon a relation between a presentation context representation representing the presentation context and said selection context representation, the presentation context representation including at least a geographical area The electronic device may be, for example, a portable device, like a webtablet, a tabletPC, a PDA, or a mobile phone.

These and other aspects of the method and the electronic device of the invention will be further elucidated and described with reference to the drawings, in which.

Corresponding elements in the drawings are denoted by the same reference numerals.

Figure 1:
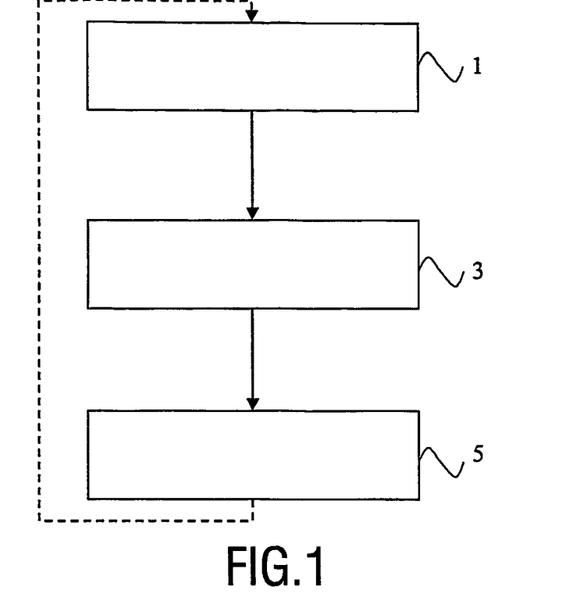
FIG. 1 is a flow chart of the method of the invention.

The method of the invention, see FIG. 1, comprises three steps. Step 1 comprises enabling a user to select an item in a selection context, a selection context representation representing the selection context. The selection context representation includes at least a parameter indicating a geographical area. Step 3 comprises associating said item with said selection context representation. Step 5 comprises presenting a plurality of items including said item in a presentation context in dependence upon a relation between a presentation context representation representing the presentation context and said selection context representation. The presentation context representation includes at least a parameter indicating a geographical area. After presenting the plurality of items, step 1 may be repeated to allow the user to select an item from the plurality of items.

A context may be, for example, a room in a house, like a living room or a kitchen. A portable device may support many different applications in future homes and use of these applications may strongly depend on the room. In order to ease access to applications, the portable device may present shortcuts to the most frequently used applications or content items in a particular room of the house. On entering a particular room, it could present non-disturbing small icons on the side of the screen. For instance, when a person enters the kitchen carrying the portable device, icons of a cookbook, shopping list, newspaper, radio, and calendar could be presented if they are the most frequently used there. Optionally, these icons may disappear after a certain period of time. Alternatively, items may be presented after pressing a 'location top X' button or icon, where X may be, for example, 5. The plurality of items may comprise different types of items, e.g. one content item, two applications, one bookmark and one function. A function may be used, for example, to change a setting of a device or may be, for example, an operating system function. A user may always change, for example, the brightness of his portable display when he walks into his garden.

Figure 2:
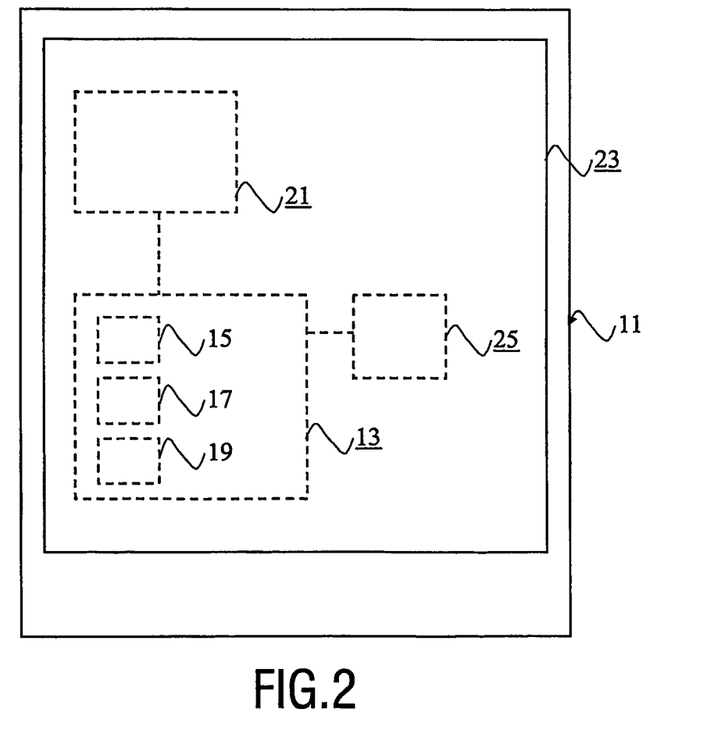
FIG. 2 is a block diagram of an embodiment of the electronic device of the invention.

An embodiment of an electronic device 11 according to the invention is shown in FIG. 2. The electronic device 11 may be, for example, a mobile phone, a PDA, a webtablet, or a tabletPC. The electronic device 11 comprises a control unit 13. The control unit 13 comprises three software modules: a selection means 15, an associating means 17, and a presenting means 19. The electronic device 11 further comprises a storage means 21, a touch-screen display 23, and a position-determining means 25. The position-determining means 25 may be, for example, a GPS component or position-determining functionality of a mobile phone network. In an alternative embodiment, associations may be stored outside the electronic device 11, for example, on a server in a computer or telephony network, and/or other input and/or output means may be incorporated into the electronic device instead of or in addition to the touch-screen display 23.

The selection means 15 is a software module for enabling a user to select an item in a selection context, a selection context representation representing the selection context, the selection context representation including at least a parameter indicating a geographical area The selection means receives input from the touch-screen display 23. The geographical area in which the electronic device 11 is located is determined by using position-determining means 25.

The associating means 17 is a software module for associating said item with said selection context representation. The associating means 17 uses storage means 21 to store the association. Associations may be stored, for example, in a relational database, an object-oriented database, or a file. A table in a relational database may contain, for example:

Multiple rows per item, one row associating one item with one geographical area and optionally with one recurring time period;

One row per item, one row associating one item with a list of geographical areas;

One row per geographical area, one row associating one geographical area with a list of items;

One row per combination of item and geographical area, one row associating an item with one geographical area and with a list of recurring time periods.

Thus, one row may be used to store one or more associations. An association may further be stored with a date or with usage statistics, e.g. a number of selections and/or a date of a most recent selection. The usage statistics should be updated after a selection. From an association stored with a date, usage statistics comprising a number of selections and/or a date of a most recent selection can be generated. This also makes it possible to use only a particular subset of a plurality of associations, for example, only items selected for the last 6 months or only the last 600 selections, to determine the relation. The geographical area may be a location or an area around the location.

The presenting means 19 is a software module for presenting a plurality of items including said item in a presentation context in dependence upon a relation between a presentation context representation representing the presentation context and said selection context representation, the presentation context representation including at least a geographical area. The presenting means 19 uses the touch-screen display 23 to display the presentation. In an alternative embodiment, the presenting means 19 may use another type of display or a printer to output the presentation.

Figure 3:
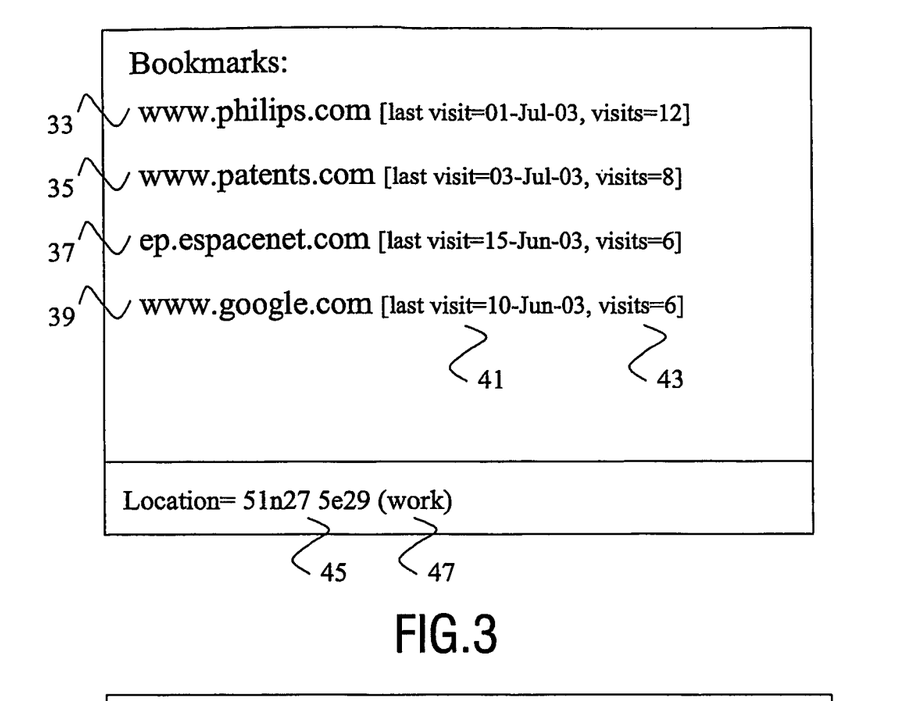
FIG. 3 is a first example of a presentation in a first embodiment of the method.
Figure 4:
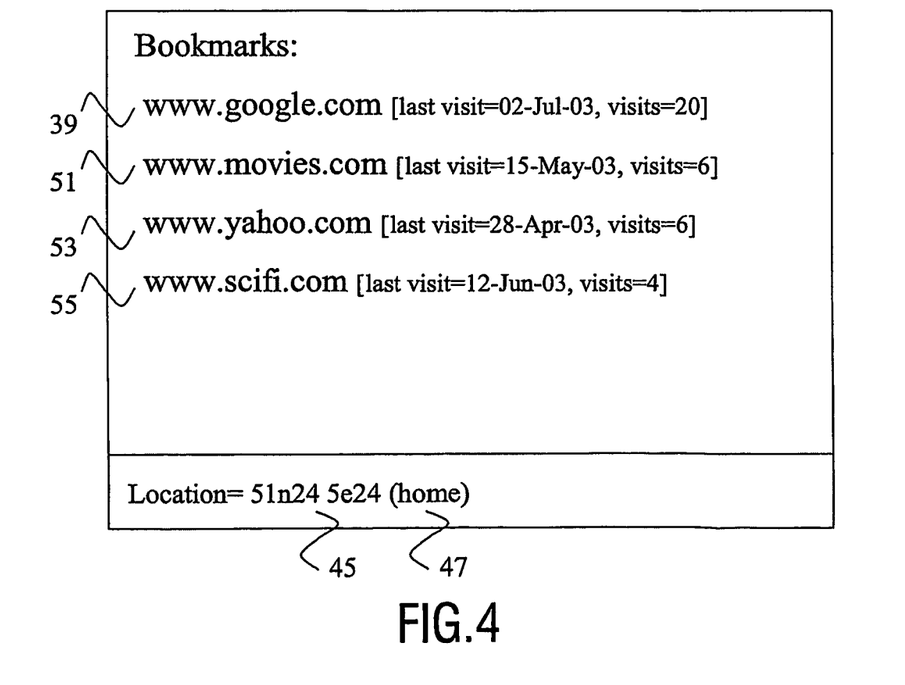
FIG. 4 is a second example of a presentation in a first embodiment of the method.

An example of a presentation of a plurality of bookmarks in a first embodiment of the method is shown in FIGS. 3 and 4. FIGS. 3 and 4 represent a location top 4 for bookmarks. FIG. 3 represents the plurality of bookmnarks as presented at work and FIG. 4 represents the plurality of bookmarks as presented at home. This embodiment of the method comprises the step of enabling a user to select a bookmark in a selection context, a selection context representation representing the selection context, associating said bookmark with said selection context representation, and presenting a plurality of bookmarks including said bookmark in a presentation context in dependence upon a relation between a presentation context representation representing the presentation context and said selection context representation. Both the selection context representation and the presentation context representation include at least a parameter indicating a geographical area.

In this embodiment, the parameter indicating the geographical area in the presentation context representation is a position determined with a position-determining means. A first geographical area label 45 represents this position. A second geographical area label 47 displays a description that has been previously associated with a geographical area comprising the position represented by first geographical label 45. The geographical label 47 may be, for example, 'home', 'work', 'bus station', 'school', 'mall', or 'airport'. If a bookmark is selected, the first geographical area label 45 or the second geographical area label 47 may be used, for example, as the parameter indicating a geographical area in a selection context representation.

In this embodiment, the relation exists for all bookmarks that are presented: all bookmarks of FIG. 3 have been previously selected at work. Four bookmarks are presented in FIG. 3. Bookmark 33 links to www.philips.com and was last visited at work on Jul. 1, 2003 and was visited 12 times at work. Bookmark 35 links to www.patents.com and was last visited at work on Jul. 3, 2003 and was visited 8 times at work. Bookmark 37 links to ep.espacenet.com and was last visited at work on Jun. 15, 2003 and was visited 6 times at work. Bookmark 39 links to www.google.com and was last visited at work on Jun. 10, 2003 and was visited 6 times at work. The four bookmarks are primarily ordered in accordance with the number of selections and secondarily ordered in accordance with the most recent date of selection.

Four bookmarks are also presented in FIG. 4. Bookmark 39 is again presented, because it has also been selected at home. It was last visited at home on Jul. 2, 2003 and was visited 20 times at home. Bookmark 39 has been selected more often at home than at work and is also more likely to be selected at home in the future. It has also been selected more times than the other bookmarks and is therefore most noticeably presented at the top of the list. Bookmarks 32, 35, and 37, shown in FIG. 3, have not been selected at home and are therefore not presented in FIG. 4. Three new bookmarks are presented in FIG. 4 that have been previously selected at home. Bookmark 51 links to www.movies.com and was last visited at home on May 15, 2003 and was visited 6 times at home. Bookmark 53 links to www.yahoo.com and was last visited at home on Apr. 28, 2003 and was visited 6 times at home. Bookmark 55 links to www.scifi.com and was last visited at home on Jun. 12, 2003 and was visited 4 times at home.

Figure 5:
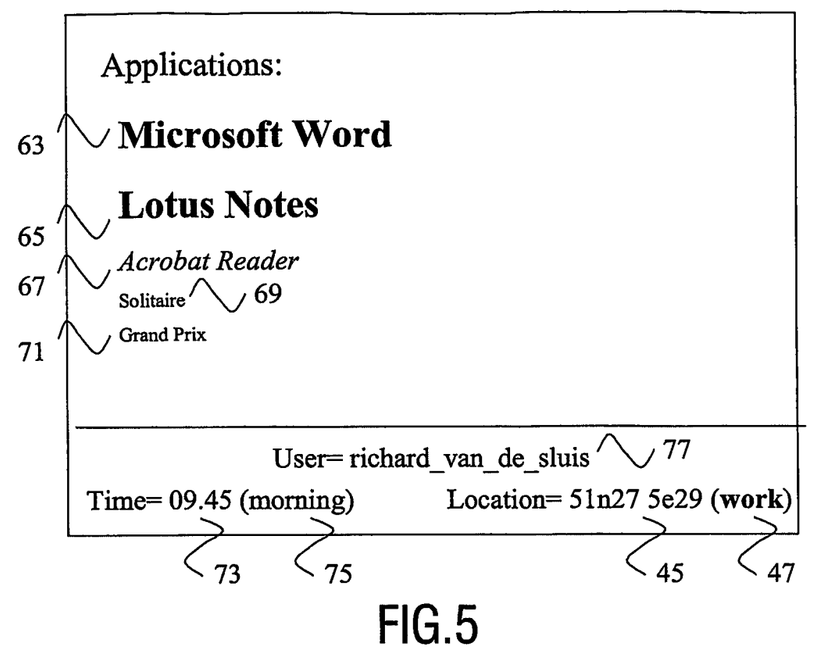
FIG. 5 is a first example of a presentation in a second embodiment of the method.
Figure 6:
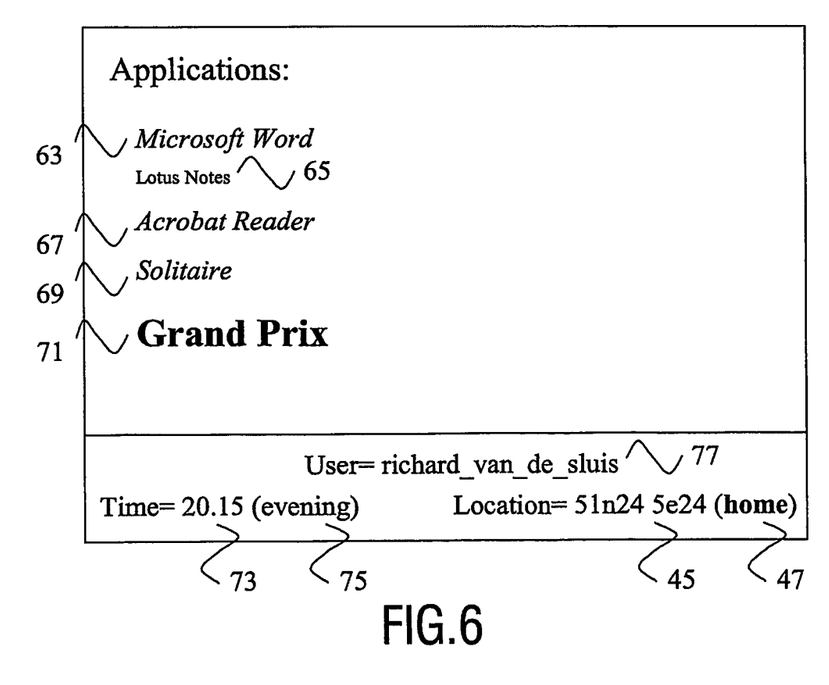
FIG. 6 is a second example of a presentation in a second embodiment of the method.
Figure 7:
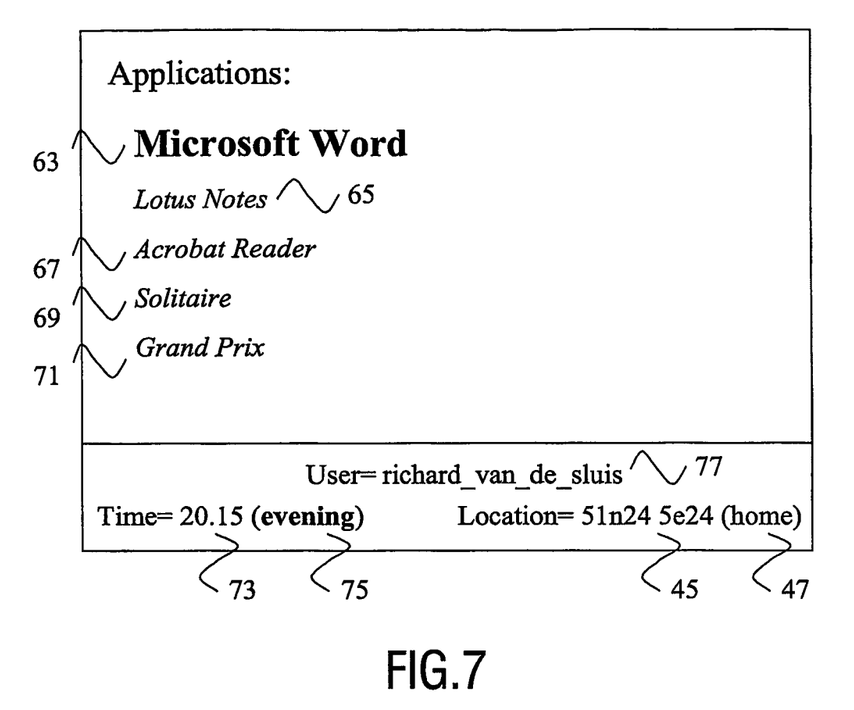
FIG. 7 is a third example of a presentation in a second embodiment of the method.

An example of a presentation of a plurality of applications in a second embodiment of the method is shown in FIGS. 5 to 7. FIG. 5 represents the plurality of applications as presented at work in the morning. FIGS. 6 and 7 represent the plurality of applications as presented at home in the evening. This embodiment of the method comprises the step of enabling a user to select an application in a selection context, a selection context representation representing the selection context, associating said application with said selection context representation; and presenting a plurality of applications including said application in a presentation context in dependence upon a relation between a presentation context representation representing the presentation context and said selection context representation. Both the selection context representation and the presentation context representation include a parameter indicating a geographical area as well as a parameter indicating a recurring time period.

In this embodiment, in addition to the first geographical area label 45 and the second geographical area label 47, see FIGS. 3 and 4, a current time indicator 73 and a recurring time period label 75 are displayed. The recurring time period label 75 displays a description or range that has been previously associated with a time period comprising the current time. If an application is selected, the recurring time period label 75 may be used, for example, as the parameter indicating a recurring time period in a selection context representation.

Determining the relation between the selection context representation and the presentation context representation comprises applying a first weight to a relation between the geographical areas and applying a second weight to a relation between the recurring time periods. This is achieved, for example, by first assigning a value 1 to a variable geographical_area_relation if a relation exists between a geographical area at the moment of selection and a geographical area at the moment of presentation, or a value 0 if such a relation does not exist. Secondly, a value 1 may be assigned to a variable recurring_time_period_relation if a relation exists between a recurring time period at the moment of selection and a recurring time period at the moment of presentation, or a value 0 if such a relation does not exist Next, a relation value may be calculated by applying weights to the variables and then adding the variables. The relation may be determined to exist if the relation value exceeds a certain threshold.

In this embodiment, the number of selections in the geographical area has been multiplied with the variable geographical_area_relation, and the number of selections in the recurring time period has been multiplied with the variable recurring_time_period before adding the variables. The relation value is used to determine a degree of the relation. The font size and the font type of the application (title) are based on the relation value. Assigning a higher value to the variables reduces the influence of the number of selections. In FIG. 6, more weight is applied to the geographical area, which is illustrated with the second geographical area label 47 being presented in a bold font type. In FIG. 7, more weight is applied to the recurring time period, which is illustrated with the recurring time period label 75 being presented in a bold font type.

In this example, not all applications of FIG. 5 have been previously selected at work. Five applications are presented in FIG. 5. Selecting application 63 starts a word processor called Microsoft Word. Selecting application 65 starts a groupware application called Lotus Notes. Selecting application 67 starts a document reader called Acrobat Reader. Selecting application 69 starts a game called Solitaire. Selecting application 71 starts a game called Grand Prix. Applications 69 and 71 are presented in the most basic font size and font type, because they have never been selected at work or in the morning. Applications 63 and 65 are presented in the most noticeable font size and font type, because they have been selected many times at work in the morning. Application 67 has been selected a few times at work in the morning and is presented in a slightly larger font than applications 69 and 71. The presentation is personalized for a certain user and the presentation depends on whether the certain user is the user that selected said item. In this example, the certain user is called Richard van de Sluis as indicated by user indicator 77. Richard van de Sluis has previously selected applications 63, 65, and 67 at work in the morning.

The same five applications are presented in FIG. 6. The position and thus the order of the applications has not changed, only the font size and font type. Application 65 has never been selected at home and only a few times at work in the evening. It is presented in the most basic font size and font type, because more weight has been applied to the geographical area. In FIG. 7, application 65 is presented in a larger font with a different font type, because more weight has been applied to the recurring time period. Application 63 has been selected many times in the evening, some of these times at work and the other times at home. It has not been used much at home during other parts of the day. Applications 67 and 69 have been selected a few times at home in the evening, but not at work in the evening or at home during other parts of the day. Application 71 has been selected many times at home, some of these times in the evening and the other times in the afternoon. It has not been selected at work in the evening. As shown in FIGS. 6 and 7, application 63 has been selected more often in the evening than at home and application 71 has been selected more often at home than in the evening.

While the invention has been described in connection with preferred embodiments, it will be understood that modifications thereof within the principles outlined above will be evident to those skilled in the art, and thus the invention is not limited to the preferred embodiments but is intended to encompass such modifications. The invention resides in each and every novel characteristic feature and each and every combination of characteristic features. Reference numerals in the claims do not limit their protective scope. Use of the verb "to comprise" and its conjugations does not exclude the presence of elements or steps other than those stated in the claims. Use of the article "a" or "an" preceding an element does not exclude the presence of a plurality of such elements or steps.

'Means', as will be apparent to a person skilled in the art are meant to include any hardware (such as separate or integrated circuits or electronic elements) or software (such as programs or parts of programs) which perform in operation or are designed to perform a specified function, be it solely or in conjunction with other functions, be it in isolation or in co-operation with other elements. The invention can be implemented by means of hardware comprising several distinct elements, and by means of a suitably programmed computer. In the device claim enumerating several means, several of these means can be embodied by one and the same item of software or hardware. 'Computer program' is to be understood to mean any software product stored on a computer-readable medium, such as a floppy disk, downloadable via a network, such as the Internet, or marketable in any other manner.

The invention claimed is:

1. A method of presenting a plurality of items, comprising the steps of:
    enabling a user to select an item in a selection context, a selection context representation representing the selection context, the selection context representation including at least a selection context parameter indicating a geographical area in which said selection is made, wherein said selection context parameter is separately displayed from the item;
    associating said item with said selection context representation; and
    presenting a plurality of items including said item in a presentation context wherein each of said plurality of items are displayed dependence upon a relation between a presentation context representation representing the presentation context and said selection context representation, the presentation context representation including at least a presentation context parameter indicating a geographical area in which said presentation is made, wherein said presentation context parameter is separately displayed from the item;
    wherein the relation between said selection context representation and said presentation context representation is determined to exist if said presentation context and said selection context at least partly overlap in geographical area such that a location of the user at the time of selection of said item is situated at least partially within the geographical area around the geographical location of the user at the time of presentation,
    wherein both the selection context representation and the presentation context representation include said selection context parameter indicating a geographical are and a time period parameter indicating a recurring time period, and determining the relation between the selection context representation and presentation context representation comprises applying a first weight to a relation between the geographical areas and applying a second weight to a relation between the recurring time periods.

2. A method as claimed in claim 1, wherein a position of said item in said presentation depends on said relation between said presentation context representation and said selection context representation.

3. A method as claimed in claim 1, wherein the presentation of the plurality of items depends on at least one of: a number of times said item has been selected in said selection context and a date of a most recent selection of said item in said selection context.

4. A method as claimed in claim 1, wherein the plurality of items are presented in an order in accordance with at least one of: a number of times each of the plurality of items has been selected and a date of a most recent selection of each of the plurality of items.

5. A method as claimed in claim 1, wherein the presentation is personalized for a certain user and the presentation depends on whether the certain user is the user that selected said item.

6. A non-transitory storage means including a program executable by a processor of a programmable device to carry out a method as claimed in claim 1.

7. An electronic device, comprising:
- a selection means for enabling a user to select an item in a selection context, a selection context representation representing the selection context, the selection context representation including at least a selection context parameter indicating a geographical area in which said selection is made, wherein said selection context parameter is separately displayed from the item;
- a presenting means for presenting a plurality of items including said item in a presentation context in dependence upon a relation between a presentation context representation representing the presentation context and said selection context representation, the presentation context representation including at least a presentation context parameter indicating a geographical area in which said presentation is made, wherein said presentation context parameter is separately displayed from the item;
- wherein the relation between said selection context representation and said presentation context representation is determined to exist if said presentation context and said selection context at least partly overlap in geographical area such that a location of the user at the time of selection of said item is situated at least partially within the geographical area around the geographical location of the user at the time of presentation,
- wherein both the selection context representation and the presentation context representation include said selection context parameter indicating a geographical are and a time period parameter indicating a recurring time period, and determining the relation between the selection context representation and presentation context representation comprises applying a first weight to a relation between the geographical areas and applying a second weight to a relation between the recurring time periods.

8. A device as claimed in claim 7, wherein a position of said item in said presentation depends on said relation between said presentation context representation and said selection context representation.

9. A device as claimed in claim 7, wherein the presentation of the plurality of items depends on at least one of: a number of times said item has been selected in said selection context and a dale of a most recent selection of said item in said selection context.

10. A device as claimed in claim 7, wherein the plurality of items are presented in an order in accordance with at least one of: a number of times each of the plurality of items has been selected and a date of a most recent selection of each of the plurality of items.

11. A device as claimed in claim 7, wherein the presentation is personalized for a certain user and the presentation depends on whether the certain user is the user that selected said item.

\* \* \* \* \*